United States Patent [19]

Kusumi et al.

[11] Patent Number: 4,616,307
[45] Date of Patent: Oct. 7, 1986

[54] PROGRAMMABLE CONTROLLER ALARM DISPLAY METHOD

[75] Inventors: Katsuaki Kusumi, Hachioji; Yoshihiro Nakashima, Machida, both of Japan

[73] Assignee: Fanuc Ltd, Minamitsuru, Japan

[21] Appl. No.: 682,361

[22] PCT Filed: Apr. 6, 1984

[86] PCT No.: PCT/JP84/00173
§ 371 Date: Dec. 6, 1984
§ 102(e) Date: Dec. 6, 1984

[87] PCT Pub. No.: WO84/03964
PCT Pub. Date: Oct. 11, 1984

[30] Foreign Application Priority Data

Jun. 4, 1983 [JP] Japan ............... 58-060533

[51] Int. Cl.⁴ .................. G06F 15/46; G06F 11/32
[52] U.S. Cl. .................. 364/147; 364/185; 364/900; 371/29
[58] Field of Search ......... 364/146, 147, 188, 189, 364/474, 475, 184, 185, 900, 167-171; 371/29

[56] References Cited

U.S. PATENT DOCUMENTS

| 3,964,026 | 6/1976 | Yamauchi et al. ........... 364/147 X |
| 4,415,965 | 11/1983 | Imazeki et al. ............ 364/147 X |
| 4,425,630 | 1/1984 | Yomogida et al. .......... 364/146 X |
| 4,441,161 | 4/1984 | Sasaki et al. ............. 364/147 X |
| 4,445,169 | 4/1984 | Wakita et al. ............. 364/147 |
| 4,504,900 | 3/1985 | Yomogida et al. .......... 364/147 X |

Primary Examiner—Joseph Ruggiero
Attorney, Agent, or Firm—Staas & Halsey

[57] ABSTRACT

A programmable controller having a memory for storing a sequence program in which messages are programmed with a processor for performing sequence control by successively executing the sequence program stored in the memory, and a display unit for displaying a ladder diagram corresponding to the sequence program of the memory as well as messages. The processor executes the sequence program and, when an alarm is sensed, causes the display unit to display a portion of a ladder associated with the alarm in accordance with alarm message data contained in the sequence program, thereby executing a rapid retrieval operation without relying upon the operator.

3 Claims, 6 Drawing Figures

Fig. 2
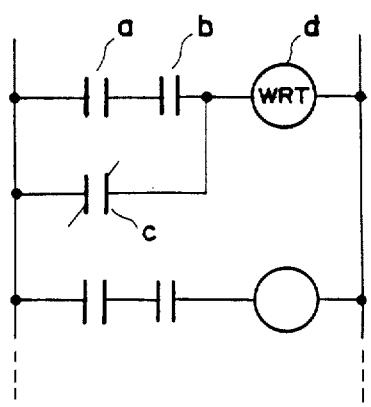
Fig. 3
|   | Operation Code | Address |
|---|---|---|
| a | RD | 10.0 |
| b | AND | 200.1 |
| c | OR NOT | 200.2 |
| d | WRT | 210.1 |
Fig. 5
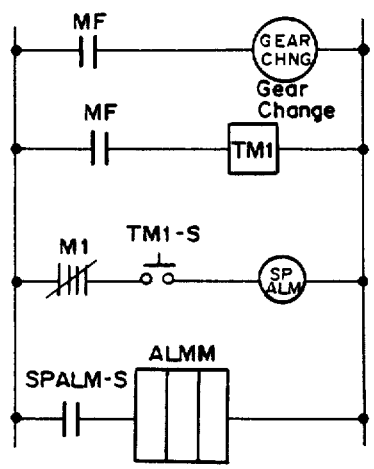
Fig. 6
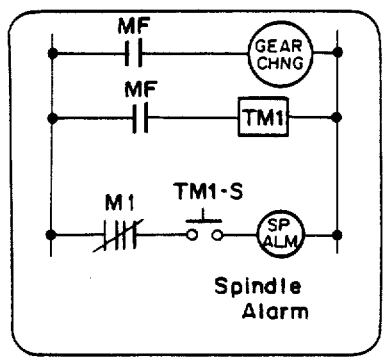

PROGRAMMABLE CONTROLLER ALARM DISPLAY METHOD

DESCRIPTION

Background of the Invention

This invention relates to a programmable controller alarm display method for displaying an alarm generated during sequence control by a programmable controller for performing sequence control. More particularly, the invention relates to a programmable controller alarm display method through which the details of an alarm and the location of a fault corresponding to the alarm can be readily distinguished even in a complicated sequence program.

In a numerical control system, various mechanical elements in machine tools are controlled on the basis of commands issued by a numerical control device (including an operator's panel). Heretofore, in such numerical control systems, a magnetics circuit comprising a multiplicity of relays has been interposed between the numerical control device (hereinafter referred to as an NC device) and the machine tool. Prescribed ones of these relays are actuated in response to NC commands (M- and S-function instructions and commands from the operator's panel), whereby the mechanical elements are caused to operate in accordance with the NC commands.

However, the conventional systems of the above type, besides being large in size, are high in cost due to the need for a large number of relays. They are also poor in reliability due to mechanical failure of the relays and the like.

In contrast to the foregoing arrangement, a low cost and highly reliable system in which a programmable controller performs, through program processing, the function of the magnetics circuit is now the system most widely employed.

In a programmable controller of this kind, a sequence program is stored in a memory and a processor executes the sequence program to control the sequence of a machine. The programmable controller is provided with a display unit such as a CRT (cathode-ray tube) for displaying a ladder diagram indicative of the sequence program in the memory, messages, etc.

Sequence programs have recently increased in quality and sophistication. In the control of NC machine tools, for example, even ATC (automatic tool change), APC (automatic part change) and the like are controlled by sequence programs. When a sequence program controls such complex operations, it is required that the sequence be subjected to a meticulous alarm checking operation so that countermeasures can be taken quickly when a machine malfunction occurs.

In the widely employed system an alarm or an alarm message is displayed on a display unit when a machine malfunction occurs. At such time it is required that the operator respond by searching the entire ladder for the separate, corresponding portion of the ladder, displaying this portion on the display unit and then investigating the same.

However, it is a laborious and time-consuming task for the operator to find the pertinent portion of the ladder in a complicated sequence program; a long period of time is needed to free the machine of the fault; and both the operating efficiency of the machine and the amount of work done are likely to decline.

SUMMARY OF THE INVENTION

Accordingly, an object of the present invention is to provide a programmable controller alarm display method through which the type and location of a machine fault can be immediately retrieved and displayed without an operator looking for and investigating a portion of a ladder.

In the present invention, a programmable controller, which controls a mechanical element of a machine tool in accordance with a prescribed sequence program on the basis of a command from a numerical control device, is provided with:

a memory for storing the sequence program; a processor for executing the sequence program; and a display unit for displaying in addition to messages, a ladder diagram corresponding to the sequence program. When the processor senses an alarm while the sequence program is being run, the location of a fault corresponding to the alarm is retrieved from the sequence program and the location is displayed on the display unit together with the details of the fault. More specifically, data in conformance with the location and details of an alarm when an alarm occurs are stored beforehand in an alarm process portion of a sequence program. When the alarm is generated, this data is utilized to retrieve the sequence program so that a ladder diagram corresponding to the alarm, as well as messages, can be displayed on the display unit. Accordingly, the operator can quickly verify the location and details of a fault on the latter diagram without performing a retrieval operation, thereby allowing recovery measures to be taken immediately upon the occurrence of a machine malfunction so that a decline in the operating efficiency of the machine can be held to a minimum.

BRIEF DESCRIPTION OF THE DRAWINGS

FIG. 2 is a ladder diagram used in the present invention;

FIG. 3 is the program for the ladder diagram shown in FIG. 2;

FIG. 5 is a ladder diagram per the present invention; and

FIG. 6 is shows a display according to the present invention.

DETAILED DESCRIPTION OF THE PREFERRED EMBODIMENT

To set forth the invention in greater detail, the invention will now be described in conjunction with the accompanying drawings.

Figure 1:
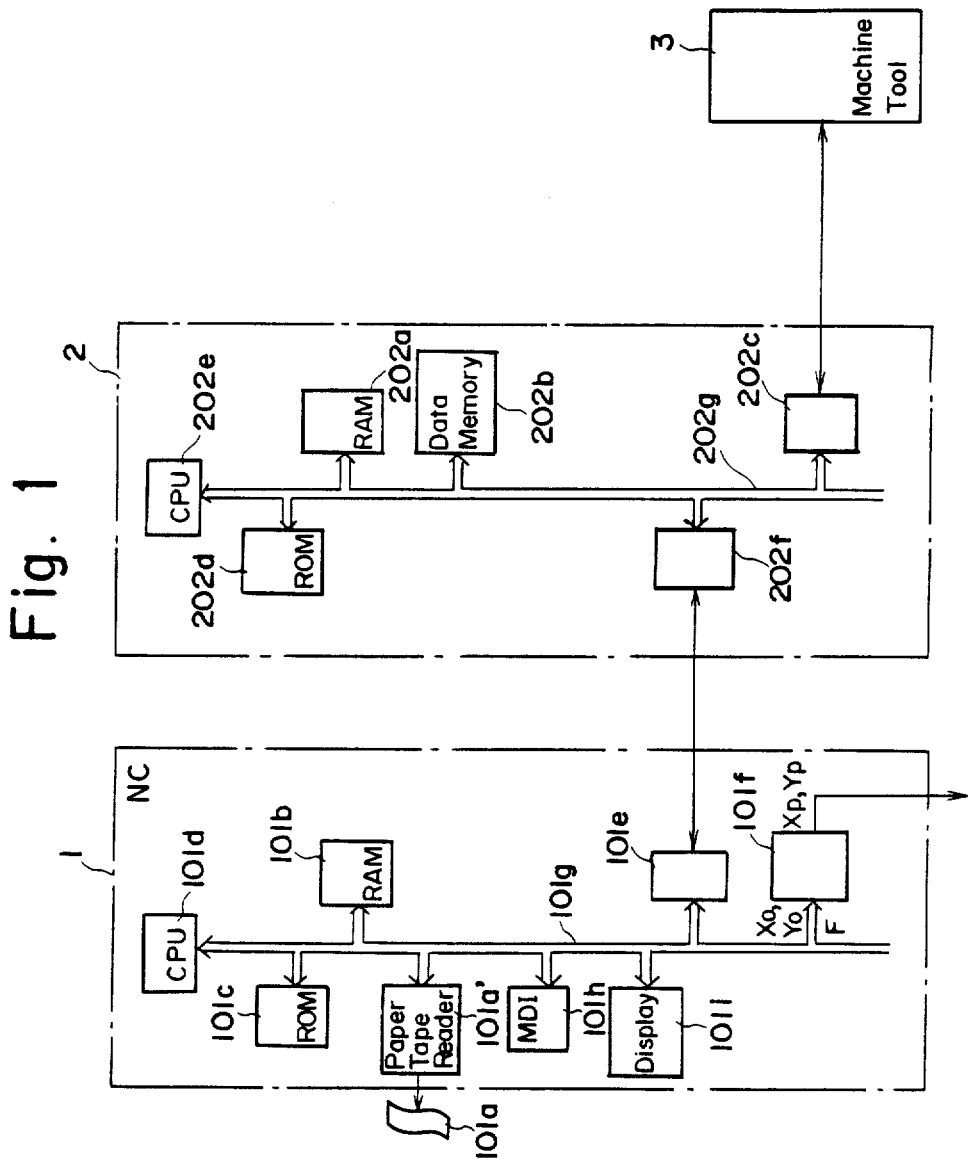
FIG. 1 is block diagram of an embodiment of the present invention.

FIG. 1 is a block diagram illustrating an embodiment of a programmable sequence controller (hereafter referred to as a PC) according to the present invention.

In the Figure, numeral 1 denotes an NC device, numeral 2 identifies a PC installed separately of the NC device, and numeral 3 identifies a machine tool.

In the numerical control device 1, numeral 101a denotes a paper tape bearing punched machining commands, 101a denotes a paper tape reader for reading the paper tape, 101b denotes a random access memory (RAM) for storing the machining commands punched in the machining tape, 101c identifies a read-only memory (ROM) which stores a control program for controlling the numerical control device 1, 101d identifies a central processing unit (CPU) for executing processing in accordance with each of the instructions of a machining command program or of the control program, 101e identifies a transceiver unit, e.g., a direct memory access controller, for exchanging data between the sequence controller 2 and the NC 1, 101f denotes a pulse distributing arithmetic circuit which receives, as inputs thereto, travelling distances Xo and Yo respectively along the X and Y axes and a feedrate F, for producing and delivering distributed pulses Xp and Yp to servo circuits (not shown) by performing a well-known arithmetic pulse distribution operation, and 101g denotes an address/data bus line. Numeral 101h denotes a manual data input unit (MDI) mounted on the operator's panel of the NC 1 and used to enter machining command data by manual operation of keys of the like. The operator's panel is used to add to or modify command data. Numeral 101i is a universal display unit for displaying, e.g., the present position of a tool or the like. The display unit and MDI may be constructed as a single unit.

In the PC 2, numeral 202a denotes a random-access memory (RAM) which stores the sequence program. The sequence program is one in which the function of a magnetics circuit is programmed logically using operation codes. By way of example, a ladder diagram constituting part of magnetics circuit shown in FIG. 2 may be programmed as depicted in FIG. 3. It should be noted that RD, AND, WRT, OR, OR NOT, etc. in the sequence program are operation codes. RD is a read operation instruction, AND is a logical product instruction, WRT is a write operation instruction, OR is a logical sum instruction, and OR NOT is an instruction for taking a logical sum with a negated value. Further, 10.0, 200.1 . . . are addresses (prescribed addresses and prescribed bits) of a data memory for execution of the operation codes. By executing a group of instructions in the sequence program, a logical operation is performed, e.g., $$(a \cdot b) + c$$

and the result of the operation (either "1" or "0") is stored in the data memory at the first bit of the 210th address thereof.

Numeral 202b of FIG. 1 denotes a data memory. The data memory 202b establishes correspondence between each relay of the magnetics circuit shown in FIG. 2 and a single bit, the on/off state of the relay being represented by logical "1" or logical "0", respectively. For example, assume that the automatic mode is commanded from the operator's panel. With a magnetics circuit, the relay a (AUT) is turned on. With the PC 2, however, "1", which corresponds to ON, is stored in the 0th bit of the tenth address in data memory 202b.

Numeral 202c represents a data input-output unit for supervising the exchange of data with the machine tool 3, 202d denotes a ROM for storing the control program which controls the overall sequence controller 2, 202e identifies a processor for executing prescribed sequence processing in accordance with the control program and sequence program, and 202f a transceiving unit for sending data to and receiving data from the NC device 1. Numeral 202g denotes an address/data bus line.

Figure 4:
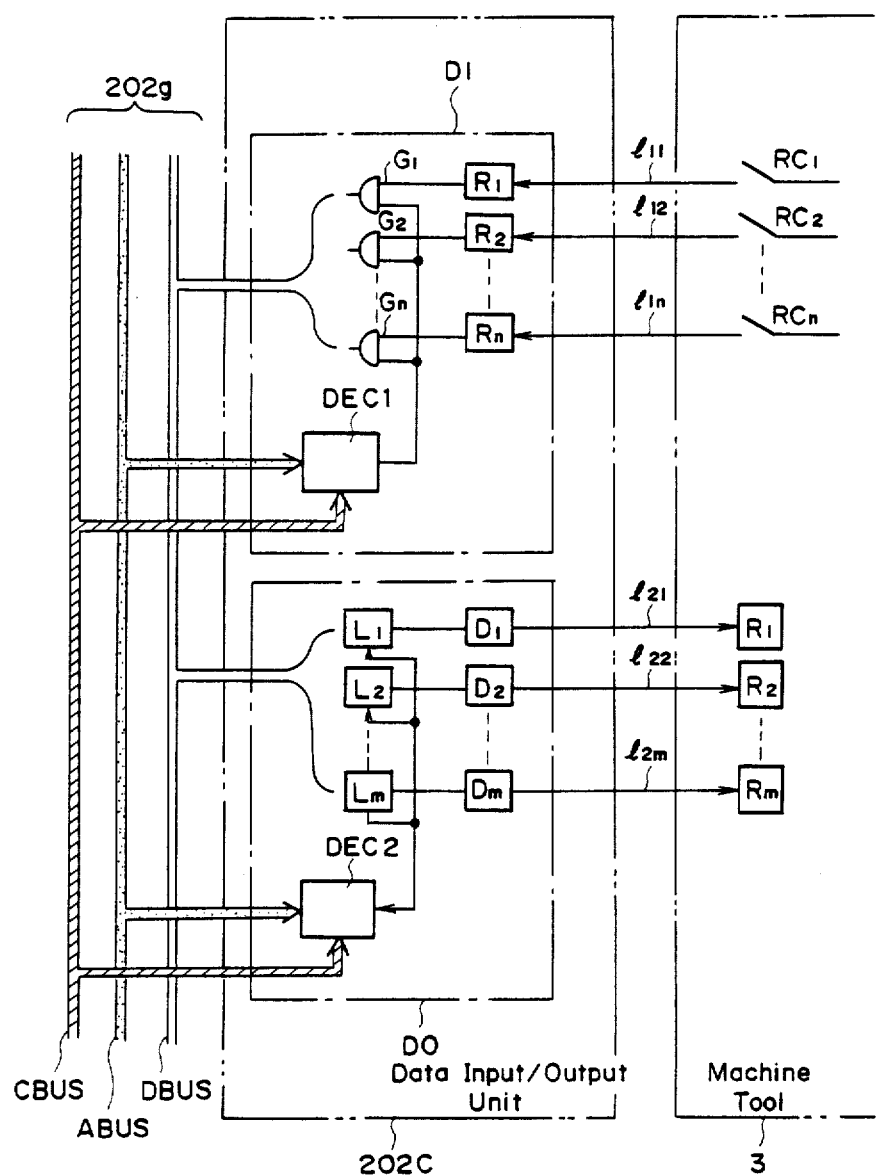
FIG. 4 is a block diagram of a data input/output unit for the embodiment of FIG. 1.

FIG. 4 is a block diagram of the data input/output unit 202c. DI represents a data input circuit having receivers $R_1$ through $R_n$ which receive signals from, e.g., various limit switches and relay contacts $RC_1$ through $RC_n$ sent from the machine side, AND gates $G_1$ through $G_n$, and a decoder $DEC_1$ which decodes address signals received from an address bus ABUS to open predetermined ones of the AND gates $G_1$ through $G_n$, each AND gate output being sent out on the data bus DBUS.

DO represents a data output circuit having flip-flops (or latch circuits if desired) $L_1$ through $L_m$ for storing such signals as forward and reverse spindle rotation signals delivered to the machine 3; drivers $D_1$ through $D_m$ connected to corresponding ones of the flip-flops $L_1$ through $L_m$ for delivering the output signals from the flip-flops to the machine 3 to actuate relays $R_1$ through $R_m$ of the machine 3; and a decoder $DEC_2$ which decodes address signals received from the address bus ABUS to place predetermined ones of the flip-flops $L_1$ through $L_m$ in a settable or resettable state, and which stores in predetermined ones of the flip-flops $L_1$ through $L_m$ the data received from the data bus DBUS. Further, CBUS denotes a control signal bus for sending and receiving control signals. Also, $l_{11}$ through $l_{1n}$ and $l_{21}$ through $l_{2m}$ denote cables interconnecting the data input/output unit 202c and the machine 3 for the exchange of data.

The operation of the PC 2 will not be described.

A previously created sequence program is stored in the RAM 202a. Therefore, in accordance with the control program in the ROM 202d, the processor 202e reads the sequence program instructions successively out of the RAM 202a, executes sequence processing steps one at a time from the first to the last instructions of the sequence program. When processing of the last instruction is completed, the CPU repeats execution of the sequence program beginning with the first instruction of the sequence program. Thus the PC repeatedly performs the processing of the sequence program instructions in cyclic fashion.

Now assume that, say, a command M03 for forward spindle rotation is issued by the NC device 1. When this takes place, logical "1" is stored in the corresponding bits of the addresses to data memory 202a where the M-function MF and the M-code signals M11, M12 are to be stored.

In accordance with what is stored, the processor 202e applies a command to the transceiver unit 202c via the bus 202g. This causes a "1" to be stored in flip-flop $L_1$ of the data output circuit DO (FIG. 4) and delivered to the machine tool 3 through the driver $D_1$ and cable $l_{21}$. As a result, the relay $R_1$ of the machine tool 3 is turned ON causing forward spindle rotation. If the spindle is rotating in the forward direction, the relay contact $RC_1$, for example, is turned ON and a forward rotation end signal is stored, via the bus 202g, in a prescribed bit of the data memory 202b (FIG. 1) through the cable $l_{11}$, receiver $R_1$, AND gate $G_1$ and data bus DBOS. Thereafter, sequence program execution continues and the NC device 1 is informed of completion of the forward rotation operation. This ends the sequence processing for forward rotation of the spindle.

The foregoing RAM 202a could instead, comprise a ROM (read-only memory) storing the sequence program, and the NC device 1 and PC 2 may be integrated so as to make common use of components.

The programmable controller possesses a function wherein messages and a ladder diagram of the sequence program in the RAM 202a are displayed on the universal display unit 101i.

Specifically, in response to a display command from the MDI 101h, the processor 101d of the NC 1 successively reads the sequence program out of the RAM 202a via the bus 101g, direct memory access controller 101e, transceiver unit 202f and bus 202g; stores the sequence program in the RAM 101b of the NC 1; transfers the contents stored in the RAM 101b to the display 101i; causes the controller of the display 101i to generate a corresponding pattern; and displays a ladder diagram corresponding to the sequence program on the screen of the display 101i, as shown in FIG. 2.

Conventionally, the ladder diagram is merely displayed in successive fashion according to the order in which the sequence program has been written. Consequently, when a malfunction occurs due to a fault (such as a relay malfunction or overload), only an alarm or an alarm message is displayed. This makes it difficult to identify the location of the fault. More specifically, when attempting to investigate why a control relay or an output relay does not turn on when it should during a sequence program, the first task is to find the pertinent control relay or output relay in the ladder diagram; which may be many pages long. The next step is to investigate the requirements for turning the relay on. Even when investigating the requirements to turn the relay ON, however, one must search the ladder which typically covers a large number of pages as mentioned above, for the relays which turn on the relay in question. Accordingly, the present invention is arranged to display not only an alarm message when a malfunction occurs, but also the ladder diagram corresponding to the alarm to make it easier to find the location at which the fault has occurred. To this end, data indicative of a ladder location which is to be displayed in correlation with an alarm message provided at a suitable point in the sequence program are separately defined beforehand in an alarm message portion. When an alarm is generated, the sequence program is retrieved on the basis of this data and the corresponding ladder location is extracted.

FIG. 5 is a ladder diagram in accordance with the present invention. The ladder diagram illustrates a sequence for changing over the gears of a machine tool spindle. The fact that the transceiving unit 202f issues a gear changeover signal is indicated by MF, and $TM_1$ indicates that a timer is started. $M_1$ supplies confirmation of a changeover end signal from the machine. A contact $TM_{1-s}$ of TM1 indicates that the changeover end signal has not been confirmed within the time limit of the timer, and SPALM indicates that an alarm is to be issued due to the changeover end signal not being confirmed within the time limit. A contact SPALM-s of SPALM indicates the fact that the next alarm message ALMM is executed when the alarm is generated. In a manner similar to that of FIG. 2, messages are programmed in the form of FIG. 3 and are constructed as part of the sequence program.

Described next will be the operation exercised when a program based on the ladder diagram of FIG. 5 is executed. The processor 202e executes the sequence program in RAM 202a under the control of the control program ROM 202d and, in response to MF, first issues a gear changeover signal. The gear changeover signal is sent to the data input/output unit 202c via the bus 202g and is delivered to the machine 3.

Next, the processor 202e starts its own timer in response to $TM_1$. Upon actually effecting the changeover operation, the machine 3 issues a changeover end signal. In response to $M_1$, the processor 202e receives the changeover end signal from the machine 3 via the data input/output unit 202c and bus 202g and writes the signal into the RAM 202a at a designated address. When the timer reaches the time limit (e.g., two or three seconds) in response to the contact of $TM_1$, the processor 202e reads the contents of the designated address of the RAM 202a and confirms whether the changeover end signal is present. If the changeover end signal is present, the system moves to the sequence indicated by the next ladder, which is not shown. If the changeover end signal is absent, on the other hand, then alarm detection is written into the designated address (e.g,. 210.1) of the RAM 202a in response to SPALM. Next, the processor 202e responds to the SPALM contact by executing what has been defined in the alarm message portion ALMM.

Defined in the alarm message portion ALMM are the character code "SPINDLE ALARM" and the address (210.1) of the alarm detection. Accordingly, on the basis of a display program, which is a subroutine, the processor 202e retrieves the sequence program in the RAM 202a by treating the address of the alarm detection as a key, reads out the message blocks before and after the sequence program, and feeds these together with the character code to the NC 1 via the bus 202g and transceiving unit 202f. When the NC 1 receives this information, the character code and message blocks are written into the RAM 101b of the NC 1 via the direct memory access controller 101e and bus 101g. Since the storage area of the RAM 101b is the area utilized as a frame buffer of the display 101i, the contents of the RAM 101b are transferred to the display 101i, and corresponding the ladder diagram and characters are displayed on the screen of the display 101i, just as in effecting the display of the above-described ladder diagram.

FIG. 6 shows an example of such a display. A ladder diagram and the characters "SPINDLE ALARM", are displayed. As a result, the display screen points shows the operator where the fault has occurred on the ladder diagram. This allows the operator to remedy the fault quickly and easily. In addition, the details of the fault location and the type of fault can be confirmed at a glance so that the optimum measures may be taken.

Thus, according to the present invention, when the processor of a programmable controller senses an alarm during execution of a sequence program stored in a memory, the processor retrieves the sequence program on the basis of data defined in an alarm message portion within the sequence program, and causes a display unit to display a ladder diagram that includes the ladder location corresponding to the alarm. Therefore, when a malfunction occurs during sequence control, the ladder location at which the alarm is issued is displayed so that the portion of the ladder corresponding to the alarm can be recognized at a glance. Accordingly, if the invention is utilized in complicated sequence control in a wide variety of fields in addition to the sequence control of machine tools, the discovery of machine failures can be hastened and optimum recovery measures taken without delay.

We claim:

1. An alarm display method in a programmable controller for controlling an apparatus, the controller having a memory for storing a sequence program in which messages are programmed, a processor for performing sequence control by successively executing the sequence program stored in said memory, and a display unit for displaying a ladder diagram corresponding to the sequence program of said memory as well as the messages, said method comprising the steps of:

(a) determining alarm conditions for the apparatus
(b) generating display information representing a ladder diagram for a sequence program associated with each of said alarm conditions;
(c) generating a sequence program for the apparatus, including ladder data specifying said display information for each of said alarm conditions, and data defining a message for each of said alarm conditions;
(d) executing said sequence program to control the apparatus;
(e) sensing execution of the sequence program;
(f) accessing the memory to retrieve the display information associated with the sensed alarm condition on the basis of the ladder data within said sequence program; and
(g) displaying on the display unit the ladder diagram represented by the accessed display information, together with the message associated with the sensed alarm condition.

2. An alarm display method according to claim 1, wherein said sequence program comprises a series of instructions, and wherein step (d) includes successively reading said instructions one at a time in accordance with a control program; and
sequentially processing the instructions cyclically from a first instruction to a last instruction.

3. An alarm display method according to claim 1, wherein said instructions comprise operation codes for controlling the operation of the processor and wherein step (d) includes executing said operation codes to perform logic operations and to control the apparatus in accordance with the results of said logic operation.

* * * * *

UNITED STATES PATENT AND TRADEMARK OFFICE
CERTIFICATE OF CORRECTION

PATENT NO. : 4,616,307
DATED : October 7, 1986
INVENTOR(S) : Kusumi et al.

It is certified that error appears in the above-identified patent and that said Letters Patent is hereby corrected as shown below:

Front Page [30], "June 4," should be --April 6,--.
Column 4, line 19, "$1_{11}$" should be --$\ell_{11}$--;

line 20, "$1_{1n}$ and $1_{21}$ through $1_{2m}$" should be --$\ell_{1n}$ and $\ell_{21}$ through $\ell_{2m}$--;

line 46, "$1_{21}$" should be --$\ell_{21}$--;

line 52, "$1_{111}$" should be --$\ell_{111}$--.

Column 5, line 19, "diagram;" should be --diagram--;
line 23, after "ladder" insert --diagram--.

Column 7, line 1, "apparatus" should be --apparatus;--.

Signed and Sealed this

Thirteenth Day of January, 1987

Attest:

DONALD J. QUIGG

*Attesting Officer*    *Commissioner of Patents and Trademarks*